US012071322B2

(12) United States Patent
Kallioniemi et al.

(10) Patent No.: US 12,071,322 B2
(45) Date of Patent: Aug. 27, 2024

(54) METHOD, A MULTICAR ELEVATOR SYSTEM, AND AN OPERATIONAL ENTITY FOR CONTROLLING MOVEMENT OF TWO OR MORE ELEVATOR CARS OF A MULTICAR ELEVATOR SYSTEM

(71) Applicant: Kone Corporation, Helsinki (FI)

(72) Inventors: Antti Kallioniemi, Helsinki (FI); Antti Saarelainen, Helsinki (FI); Paul Karlstedt, Helsinki (FI)

(73) Assignee: Kone Corporation, Helsinki (FI)

( * ) Notice: Subject to any disclaimer, the term of this patent is extended or adjusted under 35 U.S.C. 154(b) by 1354 days.

(21) Appl. No.: 16/598,041

(22) Filed: Oct. 10, 2019

(65) Prior Publication Data

US 2020/0140234 A1 May 7, 2020

(30) Foreign Application Priority Data

Nov. 6, 2018 (EP) .................................... 18204494

(51) Int. Cl.
*B66B 9/00* (2006.01)
*B66B 1/24* (2006.01)
(Continued)

(52) U.S. Cl.
CPC .............. *B66B 1/2491* (2013.01); *B66B 1/28* (2013.01); *B66B 9/003* (2013.01)

(58) Field of Classification Search
CPC ..... B66B 9/003; B66B 1/2458; B66B 1/2466; B66B 2201/103; B66B 1/468; B66B 11/0407; B66B 9/00; B66B 1/2433; B66B 2201/102; B66B 1/2491; B66B 3/00; B66B 1/2408; B66B 2201/301; B66B 1/3423; B66B 2201/104; B66B 2201/306; B66B 2201/243; B66B 11/0095;
(Continued)

(56) References Cited

U.S. PATENT DOCUMENTS

2018/0022573 A1 1/2018 Hsu et al.
2018/0022574 A1 1/2018 Pasini et al.

FOREIGN PATENT DOCUMENTS

CN 106115433 A * 11/2016 ......... B66B 11/0273
CN 106335832 A * 1/2017 ........... B66B 1/2466
(Continued)

OTHER PUBLICATIONS

European Search Report for European Patent Application No. EP 18 20 4494 dated Apr. 25, 2019.
(Continued)

*Primary Examiner* — Marlon T Fletcher
(74) *Attorney, Agent, or Firm* — Harness, Dickey & Pierce, P.L.C.

(57) ABSTRACT

The invention relates to a method for controlling movement of two or more elevator cars of a multicar elevator system. The method comprises: selecting manually via a user interface of an operational entity an elevator car from among a plurality of elevator cars to be moved and controlling movement of one or more other elevator cars from among the plurality of the elevator cars away from a driving area of the selected elevator car. The invention relates also to a multicar elevator system and an operational entity implementing at least portions of the method.

20 Claims, 6 Drawing Sheets

(51) Int. Cl.
*B66B 1/28* (2006.01)
*B66B 9/16* (2006.01)

(58) Field of Classification Search
CPC .............. B66B 2201/4638; B66B 7/02; B66B 2201/226; B66B 13/08; B66B 9/16; B66B 2201/4607; B66B 11/0213; B66B 11/0015; B66B 7/024; B66B 11/0266; B66B 11/0286
See application file for complete search history.

(56) References Cited

FOREIGN PATENT DOCUMENTS

| | | | | | |
|---|---|---|---|---|---|
| CN | 107207184 | A | | 9/2017 | |
| CN | 108602643 | A | * | 9/2018 | B66B 1/2466 |
| CN | 112236382 | A | * | 1/2021 | B66B 1/2491 |
| CN | 112441486 | A | * | 3/2021 | B66B 1/2466 |
| CN | 113336044 | A | * | 9/2021 | |
| CN | 114148842 | A | * | 3/2022 | B66B 1/24 |
| CN | 114436098 | A | * | 5/2022 | |
| CN | 115461294 | A | * | 12/2022 | B66B 1/2466 |
| DE | 102017219146 | A1 | * | 4/2019 | B66B 1/28 |
| DE | 102018201761 | A1 | * | 8/2019 | B66B 9/003 |
| EP | 1526103 | A1 | * | 4/2005 | B66B 1/2458 |
| EP | 3470358 | A1 | * | 4/2019 | |
| EP | 3521232 | A1 | * | 8/2019 | B66B 1/30 |
| EP | 3978412 | A1 | * | 4/2022 | B66B 1/28 |
| WO | WO-2006009542 | A1 | * | 1/2006 | B66B 1/2466 |
| WO | WO-2017005575 | A1 | * | 1/2017 | B66B 1/2466 |
| WO | WO-2017097367 | A1 | * | 6/2017 | B66B 1/2433 |
| WO | WO-2018050947 | A1 | * | 3/2018 | B66B 1/2466 |
| WO | WO-2019037399 | A1 | * | 2/2019 | B66B 1/18 |
| WO | WO-2019211504 | A1 | * | 11/2019 | B66B 1/2433 |

OTHER PUBLICATIONS

Chinese Office Action dated Nov. 2, 2022 issued in corresponding Chinese Appln. No. 201911071259.4.

* cited by examiner

METHOD, A MULTICAR ELEVATOR SYSTEM, AND AN OPERATIONAL ENTITY FOR CONTROLLING MOVEMENT OF TWO OR MORE ELEVATOR CARS OF A MULTICAR ELEVATOR SYSTEM

RELATED APPLICATIONS

This application claims priority to European Patent Application No. EP18204494.1 filed on Nov. 6, 2018, the entire contents of which are incorporated herein by reference.

TECHNICAL FIELD

The invention concerns in general the technical field of elevators. Especially the invention concerns multicar elevator systems.

BACKGROUND

Multicar elevator system is one elevator type, wherein a plurality of elevator cars travels within the same elevator shafts. One known implementation of the multicar elevator system is such that two or more elevator cars are arranged to travel upwards in one elevator shaft and downwards in another elevator shaft. The elevator cars may be arranged to travel between the shafts through transfer channels which connect the elevator shafts to each other. Another known implementation of the multicar elevator system is such that a plurality of elevator cars is arranged to travel independently in the same elevator shaft upwards and downwards.

The modern multicar elevator systems in which the elevator cars travel in the circular path allow independent motion of the elevator cars within the elevator shafts. The modern multicar elevator systems are typically based on a solution in which the elevator car carries at least part of the elevator motor, such as a linear motor, which generates power for moving the elevator car in the elevator shaft.

However, the multicar elevator system in which the elevator cars travel along a circular path in two shafts connected to each other has several drawbacks. Even though the elevator car may travel independently to each other, in many cases the elevator cars cannot bypass each other. For example, rescue and/or inspection drive of an elevator car may be blocked by one or more other elevator cars within a rescue or inspection area, i.e. travelling path, of the elevator car performing the rescue or inspection drive.

Hence, there is need to develop further solutions in order to improve at least in part the operation of the multicar elevator system.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a multicar elevator system, and an operational entity for controlling movement of a two or more elevator cars of a multicar elevator system. Another objective of the invention is that the method, the multicar elevator system, and the operational entity for controlling movement of a two or more elevator cars of a multicar elevator system improve at least partly the operation of the multicar elevator system.

The objectives of the invention are reached by a method, a multicar elevator system and an operational entity as defined by the respective independent claims.

According to a first aspect, a method for controlling movement of two or more elevator cars of a multicar elevator system is provided, wherein the method comprises: selecting manually via a user interface of an operational entity an elevator car from among a plurality of elevator cars to be moved, and controlling movement of one or more other elevator cars from among the plurality of the elevator cars away from a driving area of the selected elevator car.

The method may further comprise controlling via the user interface the movement of the selected elevator car.

The controlling of the movement of the one or more other elevator cars away from the driving area of the selected elevator car may comprise: generating a control signal to the one or more other elevator cars to move away from the driving area, controlling via the user interface of the operational entity the movement of the one or more other elevator cars away from the driving area, or controlling dynamically movement of the one or more other elevator cars away from the driving area.

The dynamical controlling may comprise: obtaining a distance between the one or more other elevator cars and the selected elevator car during the movement of the selected elevator car, defining based on the obtained distances and moving direction of the selected elevator car whether there is a need to move one or more other elevator cars away from the driving area, and in response to a definition that there is need to move one or more other elevator cars away from the driving area, generating a control signal to said one or more elevator cars to move away from the driving area.

The distance between the one or more other elevators and the selected moving elevator car may be obtained from the elevator car or by the elevator control unit.

The driving area of the selected elevator car may be predefined or selected manually via the user interface of the operational entity.

According to a second aspect, a multicar elevator system is provided, wherein the multicar elevator system comprising: a plurality of elevator cars, an elevator control unit, and an operational entity comprising a user interface configured to generate one or more control signals indicative of selecting an elevator car from among the plurality of elevator cars to be moved, wherein the elevator control unit is configured to control movement of one or more other elevator cars from among the plurality of elevator cars away from a driving area of the selected elevator car.

The elevator control unit may be further configured to control the movement of the selected elevator car in response to receiving from the user interface of the operational entity one or more control signals indicative of the movement of the selected elevator car.

In order to control the movement of the one or more other elevator cars away from the driving area of the selected elevator car, the elevator control unit may be configured to: generate a control signal to the one or more other elevator cars to move away from the driving area, control the movement of the one or more elevator cars away from the driving area in response to receiving from the user interface of the operational entity one or more control signals indicative of the movement, or dynamically control the movement of the one or more other elevator cars away from the driving area.

In order to dynamically control the movement of one or more other elevator cars away from the driving area the elevator controller may be configured to: obtain a distance between the one or more other elevator cars and the selected elevator car during the movement of the selected elevator car, define based on the obtained distances and moving direction of the selected elevator car whether there is a need to move one or more other elevator cars away from the driving area, and in response to a definition that there is need to move one or more other elevator cars away from the driving area the elevator control unit, generate a control signal to said one or more elevator cars to move away from the driving area.

The distance to the selected moving elevator car may be obtained from the elevator car or by the elevator control unit.

The operational entity may be one of the following: a test and emergency panel arranged outside an elevator shaft, an inspection drive station arranged inside an elevator shaft, a mobile device.

According to a third aspect, an operational entity for controlling movement of two or more elevator cars of a multicar elevator system is provided, the operational entity comprises a user interface configured to: generate one or more control signals indicative of selecting an elevator car from among a plurality of elevator cars to be moved, and generate one or more control signals to the elevator control unit indicative of controlling the movement of one or more other elevator cars from among the plurality of elevator cars away from a driving area of the selected elevator car being moved.

The operational entity may be one of the following: a test and emergency panel arranged outside an elevator shaft, an inspection drive station arranged inside an elevator shaft, a mobile device.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
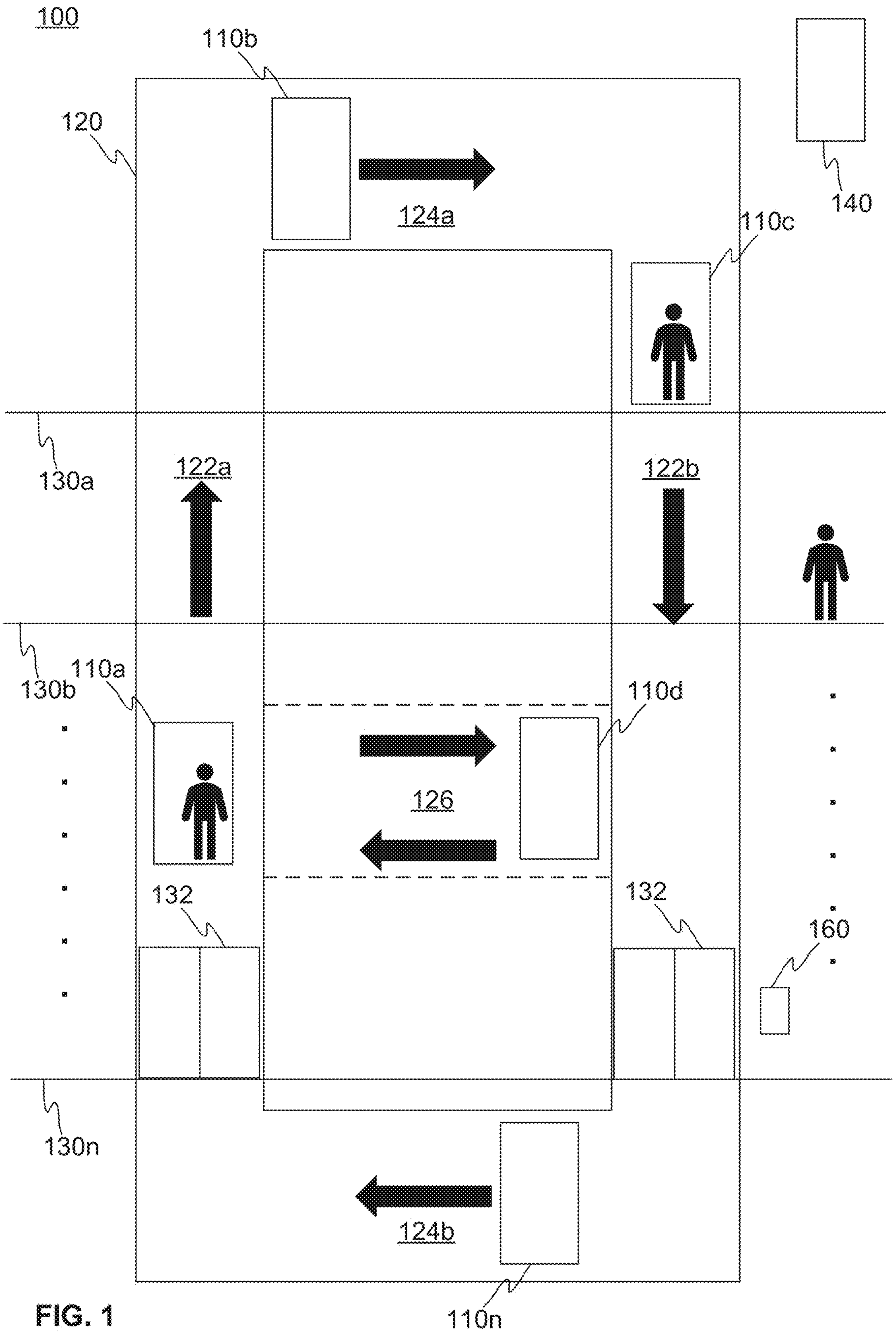
FIG. 1 illustrates schematically an example of a multicar elevator system according to the present invention.

FIG. 1 illustrates schematically an example of a multicar elevator system 100 according to the present invention. The multicar elevator system 100 may comprise a plurality of elevator cars 110*a*-110*n*, a plurality of elevator sub-systems 120, and one or more control entities, e.g. an elevator control unit 140. For example, there may be separate propulsion units for elevator cars and a common elevator control unit which manages travels of different cars between landing floors. Each elevator sub-system may comprise two or more vertical elevator shafts 122*a*, 122*b*, i.e. vertical sections, in which at least one, preferably at least two elevator cars 110*a*-110*n* may travel in a loop path. The loop path refers to an implementation in which the elevator car may travel upwards in one vertical section, such as in a first shaft 122*a*, and downwards in another vertical section, such as in a second shaft 122*b*. The elevator car may be transferred between the vertical sections 122*a*-122*b*, through at least two horizontal sections 124*a*, 124*b*, known also as transfer channels, arranged between the vertical sections. The horizontal sections 124*a*, 124*b*, i.e. transfer channels, may e.g. be arranged at the upper section and at the lower section of the elevator shaft as illustrated in FIG. 1. The multicar elevator system 100 according to the present invention may further comprise one or more reservation shafts 126 into which one or more elevator cars 110*a*-110*n* may be instructed. The one or more reservation shafts 126 may be used for example to store one or more elevator cars which are not operating properly, i.e. there is a malfunction in the one or more elevator cars, for bypassing an elevator car not operating properly, to store extra, e.g. idle elevator cars, and/or to be able to move more elevator cars to serve in the other direction e.g. during a traffic peak. The reservation shaft may be vertical or a horizontal channel, for example.

The power generation means for moving the plurality of elevator cars 102*a*-102*n* in each sub-system 120 may be any suitable means. For example, a linear motor may be used in the context of the present invention. However, the invention is not limited to that only, but any means which may be controlled with a control device for controlling the motion of the elevator car may be applied to. Moreover, even if it is illustrated one elevator sub-system 120 comprising two vertical shafts 122*a*, 122*b* and two transfer channels 124*a*, 124*b*, and one reservation shaft 126 in FIG. 1, the number of sub-systems, vertical shafts, transfer channels, and/or reservation shafts is not anyhow limited in view of an inventive idea of the present idea. The elevator cars 110*a*-110*n* are configured to travel between landings 130*a*-130*n*. In FIG. 1 only landing doors 132 of the bottom landing 130*n* are illustrated, but each landing comprises landing door, which are not illustrated in FIG. 1 for sake of clarity.

The multicar elevator system 100 may comprise one or more control entities configured to control at least some operations of the multicar elevator system 100. In the implementation as illustrated in FIG. 1, the control entity is, as a non-limiting example, an elevator control unit 140, i.e. elevator controller, which may be configured to control an operation of the multicar elevator system 100 at least in part. The elevator control unit 110 may reside for example inside a machine room in shaft or in a lockable control cabinet in a landing. The elevator control unit 140 may be configured to receive input signals and generate output signals to predetermined entities of the multicar elevator system 100, such as elevator call devices, operational entity, power generation means of one or more elevator cars, etc. The elevator control unit 140 may also be configured to communicate with any external entities, such as with a data center configured to monitor and control of the multicar elevator system 100 and/or any sub-systems therein. The communication to and from the elevator control unit 140 may be arranged in a wireless or in a wired manner so that the communication between the entities may be established as described throughout this application.

Figure 2:
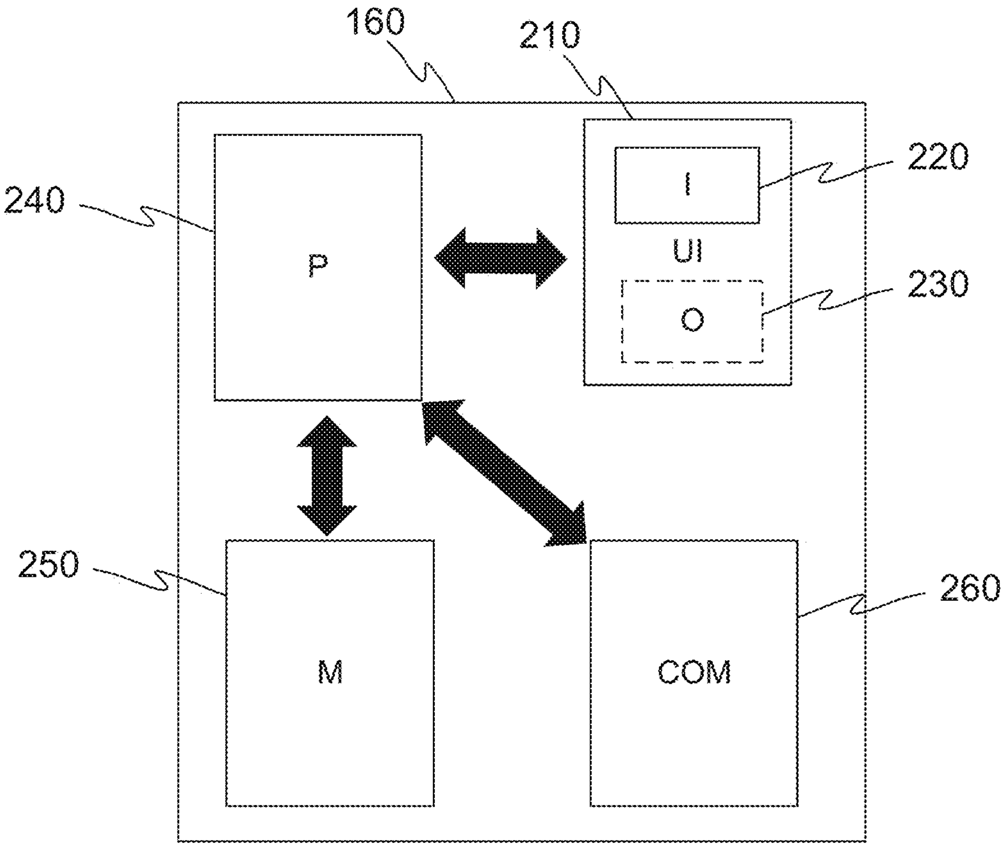
FIG. 2 illustrates schematically an example of entities of the operational entity according to the invention.

The multicar elevator system 100 may further comprise an operational entity 160 via which movement of the plurality of elevator cars 110*a*-110*n* of the multicar elevator system 100 may be controlled. FIG. 2 illustrates schematically an example of the entities of the operational entity 160 according to the invention. The operational entity 160 may comprise a user interface 210 for interacting with at least one user. The user interface 210 may comprise one or more input devices 220, such as buttons, keyboard, touch screen, etc., for receiving user input. Furthermore, the user interface 210 may comprise one or more output devices 230, such as display, loudspeaker, touch screen, etc., for outputting information. For example, the operational entity may comprise a display for indicating location of an elevator car moved via the operational entity inside the elevator shaft, movement information, such as speed and/or direction, of the elevator car moved via the operational entity, and/or location of one or more other elevator cars in relation to the location of the elevator car moved via the operational entity. The operational entity 160 may further comprise a processing unit 240 comprising one or more processors, and a memory unit 250 comprising one or more memories. The one or more processors of the processing unit 240 of the operational entity 160 may be any suitable processor for processing information and control the operation of the operational entity 160 at least in partly, among other tasks. The memory unit 250 may store portions of computer program code and any other data, and the processing unit 240 may cause the operational entity 160 to operate as described by executing at least some portions of the computer program code stored in the memory unit 250. The one or more memories are not limited to a certain type of memory only, but any memory type suitable for storing the described pieces of information may be applied in the context of the invention.

The operational entity 160 may further comprise a communication unit 260 for providing an interface for communication with any external units or entities of the multicar elevator system 100, such as the elevator control unit 140. The communication to and from the operational entity 160 may be based on at least one known communication technologies, either wired or wireless, in order to exchange pieces of information as described throughout this application. The operational entity 160 may be a separate entity communicatively coupled to the elevator control unit 140 or it may be at least partly integrated with the elevator control unit 140.

According to an embodiment of the invention, the operational entity 160 may be a test and emergency panel arranged outside the elevator shaft as illustrated in FIG. 1. The test and emergency panel may be used for example for performing so called rescue drive, i.e. in emergency situations to rescue passengers trapped inside a stopped elevator car. The rescue drive is performed with reduced speed so that the stopped elevator car is controlled via the test and emergency panel to move to a predefined destination landing, such as the closest landing or the bottom landing 130*n*. Alternatively or in addition, the test and emergency panel may be used for example for performing a test drive. The test drive of the elevator system may comprise for example tests of traction, safety gear, buffer, ascending car overspeed protection means, unintended car movement protection, rupture valve, restrictor, pawl device, cushioned stop, pressure, etc. The test and emergency panel is arranged outside the elevator shaft, for example inside a machine room of the elevator system or at a landing, such as the bottom landing 130*n* or top landing 130*a*, to enable that the test and emergency operations may be carried out via the panel from outside the shaft. The test and emergency panel shall be accessible to authorized persons only. The test and emergency panel may be communicatively coupled via the communication unit 240 to the elevator control unit by any known wired or wireless manner.

According to an embodiment of the invention, the operational entity 160 may be an inspection drive station arranged inside the elevator shaft (not shown in FIG. 1), for example to a pit of the elevator shaft or to the roof of one elevator car. The inspection drive station may be used for example in an inspection drive preformed from inside the elevator shaft. The inspection drive is performed with reduced speed during for example maintenance or installation of the elevator system. The inspection drive station shall be accessible to authorized persons only. A lockable housing may be arranged e.g. to the pit or the roof of one elevator car for accommodating the inspection drive station, when the inspection drive station is not in use. The normal operation of the elevator car may be allowed only when the inspection drive station resides inside the housing and when the inspection drive station is outside the housing the inspection drive operation is allowed. The inspection drive station may be communicatively coupled via the communication unit 240 to the elevator control unit 140 by any known wired or wireless manner.

According to an embodiment of the invention, the operational entity 160 may be a mobile device, such as a mobile phone, tablet computer, etc., (not shown in FIG. 1). The mobile device may be used to manually control the movement of the plurality of the elevator cars of the multicar elevator system 100. The movement may be rescue drive or inspection drive performed with reduced speed or any other movement of the elevator car.

Because the multicar elevator system 100 comprises a plurality of elevator cars 110*a*-100*n* travelling along the same elevator shafts as discussed above, it may cause that a driving area of an elevator car that is needed to be moved may be blocked by one or more other elevator cars. The elevator car 110*a*-110*n* to be moved may be selected via the user interface of the operational entity 160. The user interface 210 of the operational entity 160 may be configured to generate one or more control signals indicative of selecting an elevator car from among the plurality of elevator cars 110*a*-110*n* of the multicar elevator system 100 to be moved. The generated one or more control signals may be provided to the elevator control unit 140, which is configured to control the selection of the elevator car.

According to a non-limiting example, the one or more signals indicative of selecting the elevator car may be generated in response to activation of one or more input devices 220 of the user interface 210 of the operational entity 160. For example, the user interface 210 may comprise separate selection button for each elevator car to enable selection of an elevator car from among the plurality of elevator cars 110*a*-110*n*. According to another non-limiting example, the user interface 210 may comprise a display displaying the plurality of the elevator cars 110*a*-110*n* for example in a form of a list or a matrix and at least one input device 220, such as a button, to enable selection of an elevator car from among the plurality of elevator cars 110*a*-110*n*. Alternatively, the display and the one or more input devices 220 may be implemented a touch screen.

The elevator control unit 140 is configured to control movement of one or more other elevator cars from among the plurality of elevator cars 110*a*-110*n* of the multicar elevator system 100 away from a driving area of the selected elevator car. The one or more other elevator cars may be moved for example to another elevator shaft 122*a*, 122*b*, a reservation shaft 126, a transfer channel 124*a*, 124*b*, and/or outside the driving area of the selected elevator car within the same elevator shaft. The control of the movement of the one or more elevator cars away from a driving area of the selected elevator car will be discussed more later in this application.

The driving area of the selected elevator car may be predefined or selected manually via the user interface 210 of the operational entity 160. For example, the driving area may be defined to be a path from the present location of the elevator car to the closest landing, a path from the present location of the elevator car to a specific landing, such as the bottom landing 130*n*, or a path from the present location of the elevator car to any other landing, or to an inspection or maintenance area in the elevator shaft or in a transfer channel.

The elevator control unit 140 may further be configured to control the movement of the selected elevator car in response to receiving from the user interface 210 of the operational entity 160 one or more control signals indicative of the movement of the selected elevator car to a predefined direction. The control signal may e.g. refer to a signal carrying information for controlling power generation means of the selected elevator car. The predefined direction may be upwards or downwards, if the selected elevator car locates in an elevator shaft 122*a*, 112*b*, and/or horizontal direction, if the selected elevator car locates in a transfer channel 124*a*, 124*b* or a reservation shaft 126. The selected elevator car may be moved via the user interface 210 before, after, and/or during the movement of the one or more other elevator cars away from the driving area of the selected elevator car. For example, the one or more other elevator cars may be moved away before moving the selected elevator car to a predefined destination landing. Alternatively or in addition, the one or more other elevator cars may be moved away from the driving are of the selected elevator car during the selected elevator car is moving, for example as will be discussed later in this application when referring to a dynamical control of the movement of one or more other elevator cars. Alternatively or in addition, the selected elevator car may be first moved at least partly before moving the one or more other elevator cars away from the driving are of the selected elevator car and after that the selected elevator car may be moved again to the predefined destination landing.

According to a non-limiting example, the one or more control signals indicative of the movement of the selected elevator car may be generated in response to activation of one or more input devices 220 of the user interface 210 of the operational entity 160 in response to interaction with the user. Furthermore, one or more control signals indicative of a request to stop the movement of the selected elevator car may be generated in response to inactivation of one or more input devices 220 of the user interface 210 of the operational entity 160. In other words, the one or more input devices 220 of the user interface 210 may be activated, e.g. pushed, by the user, to generate the one or more control signals indicative of the movement of the selected elevator to move the selected elevator car to a predefined direction and in response to inactivate said one or more input devices 220 of the user interface 210, one or more control signals indicative of a request to stop the movement of the selected elevator car may be generated to stop the movement of the selected elevator car.

Figure 3A:
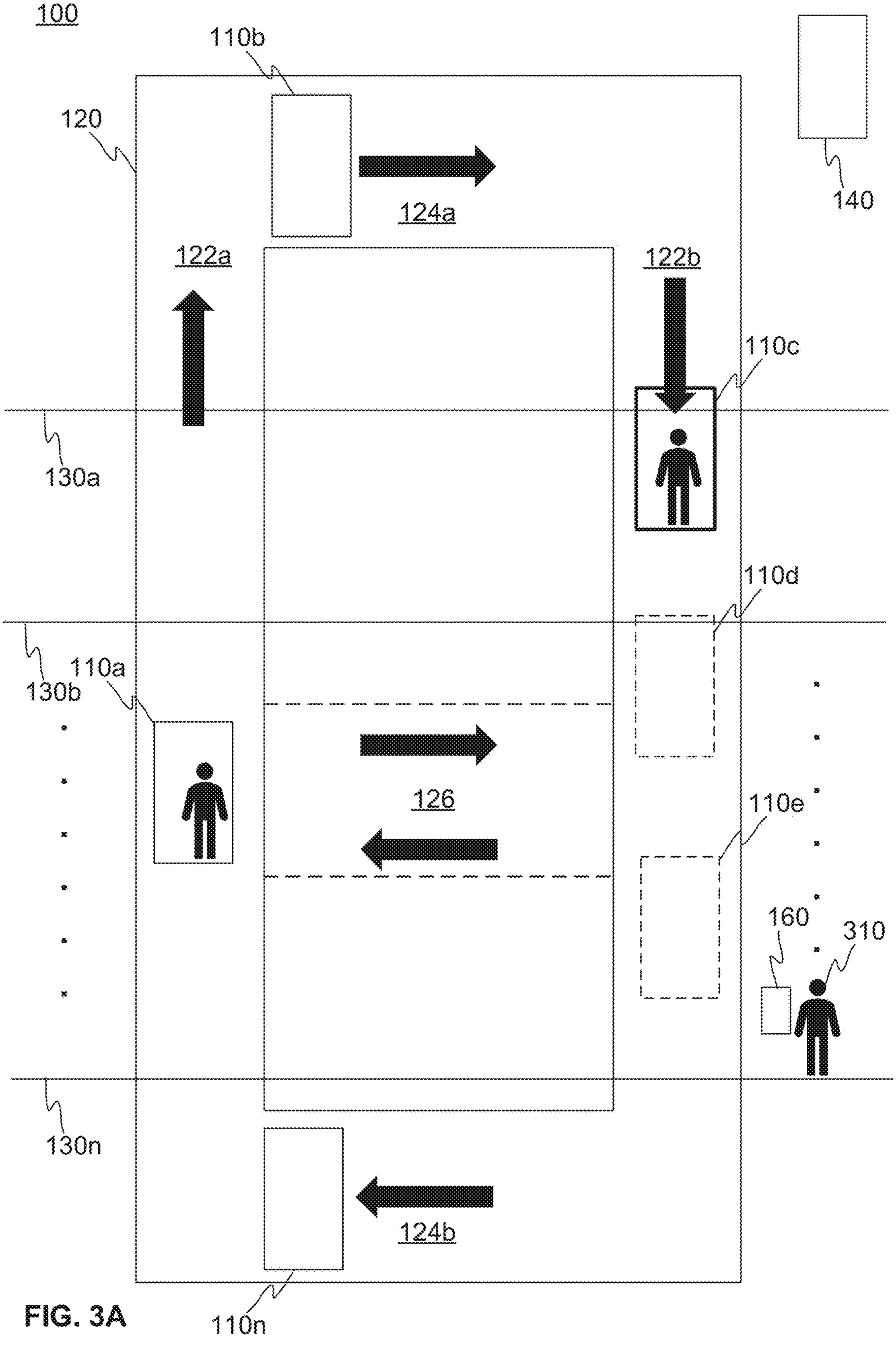
FIGS. 3A-3C illustrate schematically examples of the invention.
Figure 3B:
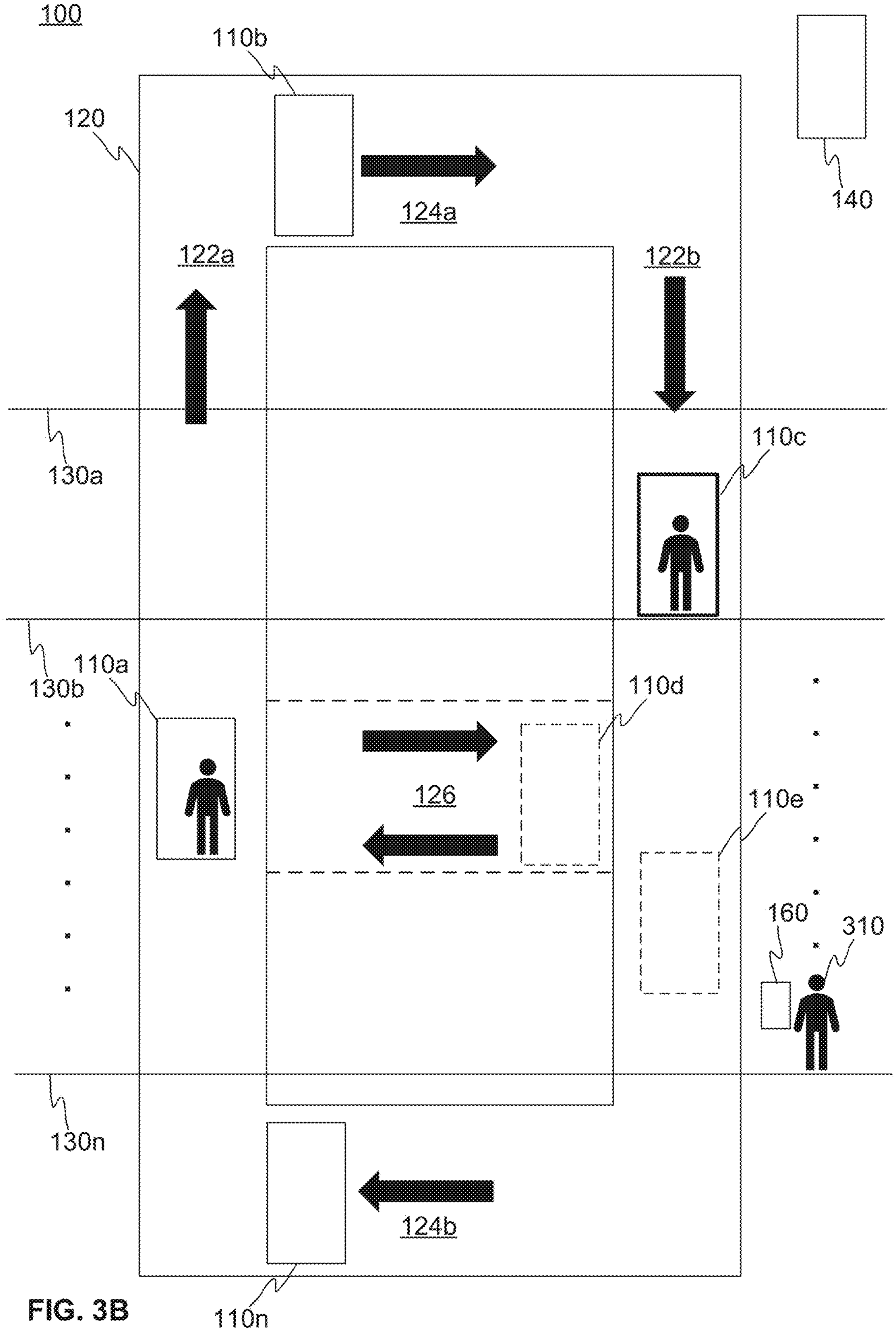
Figure 3C:
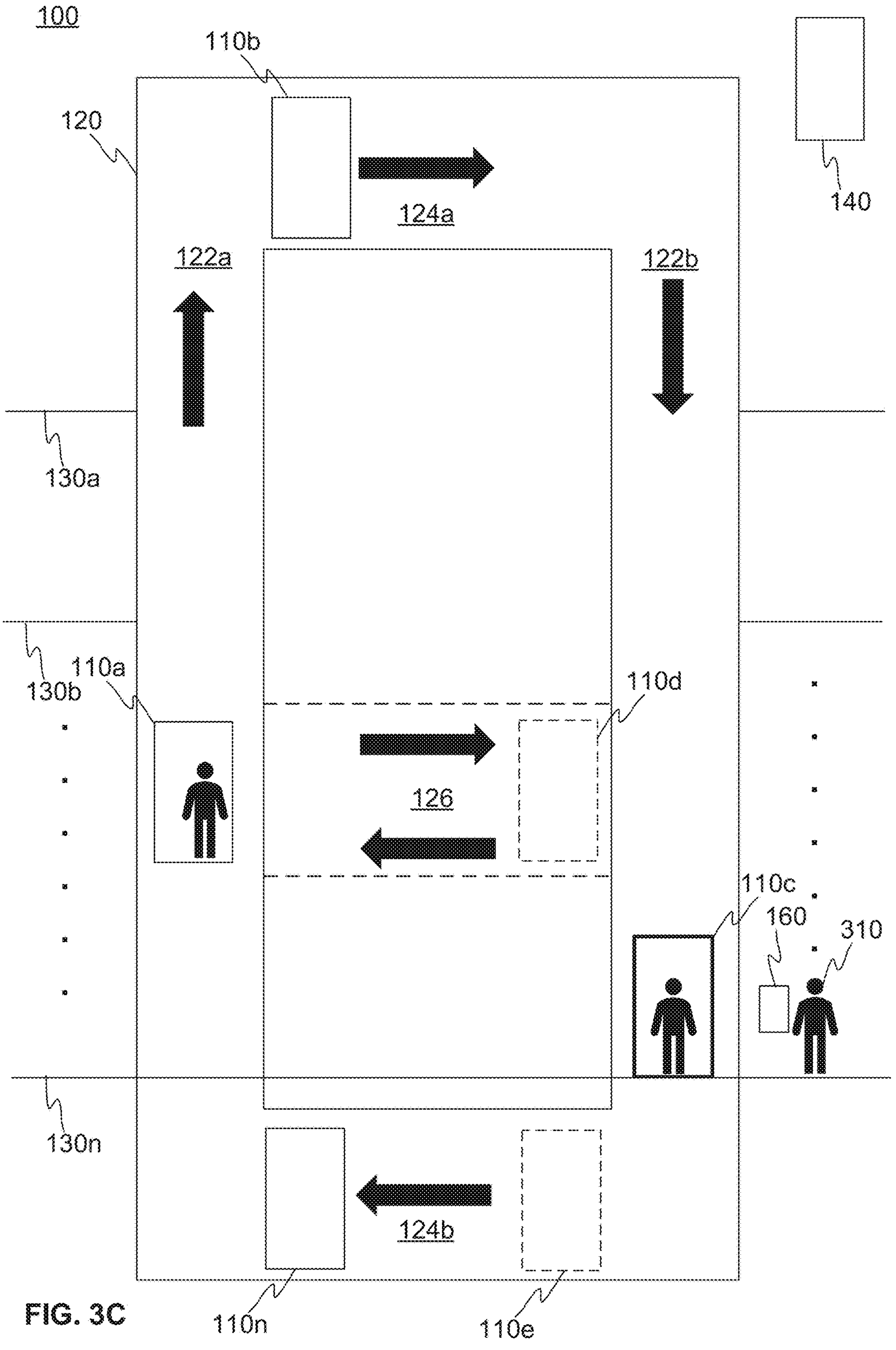

The invention is next described by applying the inventive idea to a non-limiting example situation, wherein one elevator car is stopped between landings due to e.g. a malfunction and it needs to be moved to a predefined destination landing. This is illustrated in FIGS. 3A-3C. FIG. 3A illustrates the starting situation and FIGS. 3B and 3C illustrate the end situations. For sake of clarity the landing doors 132 are not illustrated in FIGS. 3A-3C. The present invention is not limited to the example situation. The elevator car 110*c* is the stopped elevator car that needs to be moved to a predefined destination landing to allow the passengers inside the stopped elevator car 110*c* to get out from the elevator car 110*c*. The elevator car 110*c* may be selected via the user interface 210 of the operating entity 160, for example by a user 310, such as a maintenance technician. The destination landing to which the stopped elevator is moved may be defined to be the closest landing 130*b*, the bottom landing 130*n*, or any other landing. The destination landing may be selected via the user interface 210 of the operational entity 160 or the destination landing may be predefined.

In case the destination landing is the closest landing 130*b*, the elevator car 110*d* is blocking the driving area of the elevator car 110*c*, i.e. the elevator car 110*d* within the path from the present location of elevator car 110*c* to the closest landing 130*b*. Thus, the elevator car 110*d* needs to be moved away from the driving area of the elevator car 110*c*. The elevator control unit 140 controls the movement of elevator car 110*d* away from the driving area of the selected elevator car 110*c*. The elevator car 110*d* is moved to the reservation shaft 126 as illustrated in FIG. 2B. The elevator control unit 140 further controls the movement of the selected elevator car 110*c* via the user interface 210 of the operational entity 160 to the predefined destination landing, i.e. the closest landing 130*b*, as illustrated in FIG. 2B.

In case the destination landing is the bottom landing 130*n*, the elevator car 110*d* and the elevator car 110*e* are both blocking the driving area of the elevator car 110*c*, i.e. the elevator cars 110*d* and 110*e* are within the path from the present location of elevator car 110*c* to the bottom landing 130*n*. Thus, the elevator cars 110*d* and 110*e* needs to be moved away from the driving area of the elevator car 110*c*. The elevator control unit 140 controls the movement of elevator cars 110*d* and 110*e* away from the driving area of the selected elevator car 110*c*. The elevator car 110*d* is moved to the reservation shaft 126 and the elevator car 110*e* is moved to the transfer channel 124*b* as illustrated in FIG. 2B. The elevator control unit 140 further controls the movement of the selected elevator car 110*c* via the user interface 210 of the operational entity 160 to the predefined destination landing, i.e. the bottom landing 130*n*, as illustrated in FIG. 2B.

According to an embodiment of the invention, the elevator control unit 140 may be configured to generate a control signal to the one or more other elevator cars to move away from the driving area of the selected elevator car. The control signal may comprise instructions to move away from the driving area of the selected elevator car. The control signal may e.g. refer to a signal carrying information for controlling power generation means of the one or more other elevator cars. Preferably, the control signal may be generated before moving the selected elevator car to the predefined destination landing. Additionally, the one or more other elevator cars may be configured to move away from the driving area of the selected elevator car in response to the generated control signal preferably before moving the selected elevator car to the predefined destination landing.

According to an embodiment of the invention, the elevator control unit 140 may be configured to control the movement of the one or more other elevator cars away from the driving area of the selected elevator car via the user interface 210 of the operational entity 160. The elevator control unit 140 may be configured to control the movement of the one or more other elevator cars in response to receiving from the user interface 210 of the operational entity 160 one or more control signals indicative of the movement of the one or more other elevator cars. If more than one other elevator cars are needed to be moved away from the driving area, the movement of the other elevator car may be performed consecutively via the user interface 210 of the operational entity 160. Preferably, the one or more other elevator cars may be moved away from the from the driving area of the selected elevator car before moving the selected elevator car to the predefined destination landing. Similarly, as discussed above referring to controlling the movement of the selected elevator car via the user interface 210 of the operational entity 160, the one or more control signals indicative of the movement of the one or more other elevator cars may be generated in response to activation of one or more input devices 220 of the user interface 210 of the operational entity 160 in response to interaction with the user. Furthermore, one or more control signals indicative of a request to stop the movement of the one or more other elevator cars may be generated in response to inactivation of one or more input devices 220 of the user interface 210 of the operational entity 160. Each other elevator car that is needed to be moved away may be selected to be moved similarly as discussed above referring to selecting an elevator car to be moved.

According to an embodiment of the invention, the elevator control unit 140 may be configured to dynamically control the movement of the one or more other elevator cars away from the driving area. The dynamical control of the movement of the one or more other elevator cars means that the movement of the other elevator cars is performed during the movement of the selected elevator car, i.e. when the movement of the selected elevator car is in progress. In order to dynamically control the movement of one or more other elevator cars away from the driving area of the selected elevator car, the elevator control unit 140 is first configured to obtain a distance between the one or more other elevator cars to be moved away and the selected elevator car during the movement of the selected elevator car. The distance between the one or more other elevators and the selected moving elevator car may be obtained from the elevator car or by the elevator control unit 140 itself. The elevator cars may comprise one or more sensors to measure its distance to the selected elevator car. The one or more sensors may comprise for example infrared sensor, laser sensor, and/or proximity sensor. Alternatively, the elevator control unit 140 may be configured to measure the distance based on the locations of the elevator cars. The elevator control unit 140 is next configured to define based on the defined distances and moving direction of the selected elevator car, whether there is a need to move one or more other elevator cars away from the driving area of the selected elevator car. If the elevator control unit 140 defines that one or more elevator cars are within the drive area of the selected elevator car, i.e. that there is a need to move one or more other elevator cars away from the driving area of the selected elevator car, the elevator control unit 140 is configured to generate a control signal to said one or more elevator cars to move away from the driving area of the selected elevator car. The control signal may comprise instructions to move away from the driving area of the selected elevator car. The control signal may e.g. refer to a signal carrying information for controlling power generation means of the one or more other elevator cars.

Figure 4:
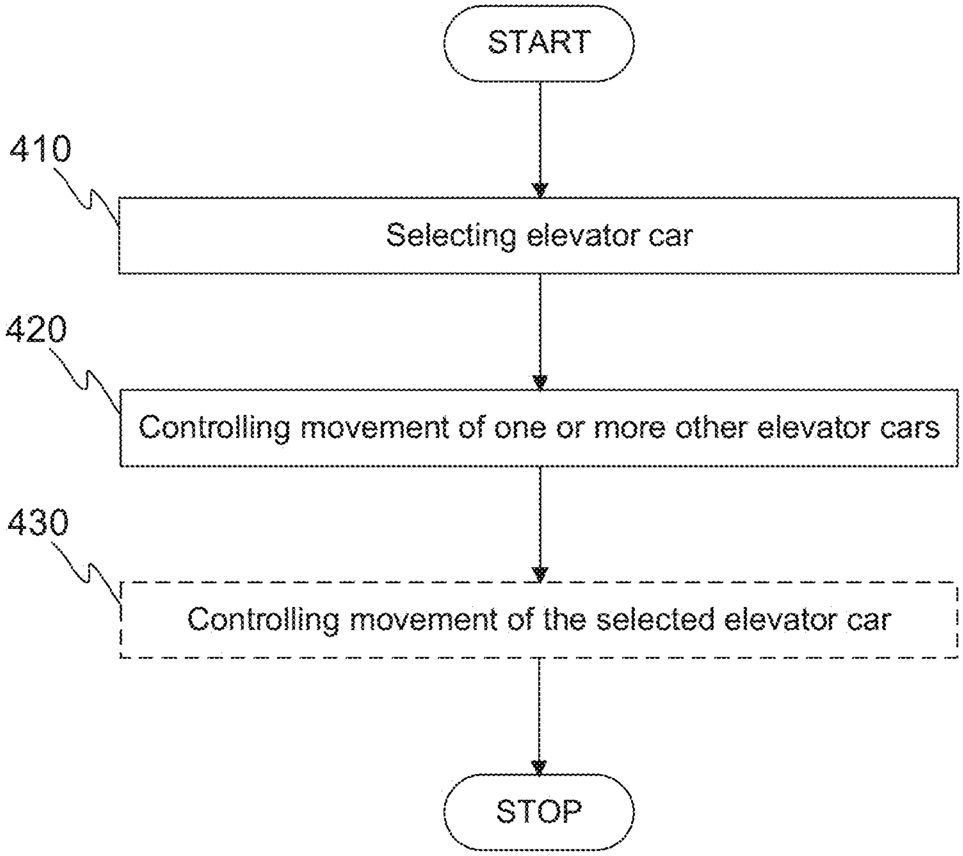
FIG. 4 illustrates schematically an example of the method according to the invention.

Above the invention is described relating to the multicar elevator system 100. Next an example of a method for controlling movement of two or more elevator cars of a multicar elevator system is described by referring to FIG. 4. FIG. 4 schematically illustrates the invention as a flow chart. The method comprises selecting 410 manually via the user interface of the operational entity an elevator car from among the plurality of elevator cars to be moved. Furthermore, the elevator control unit controls 420 the movement of one or more other elevator cars from among the plurality of the elevator cars away from the driving area of the selected elevator car as discussed above. The driving area of the selected elevator car may be predefined or selected manually via the user interface of the operational entity.

According to an embodiment of the invention, the method may further comprise controlling 430 via the user interface the movement of the selected elevator car. The selected elevator car may be moved to the predefined destination landing as discussed above.

According to an embodiment of the invention, the controlling of the movement of the one or more other elevator cars away from the driving area of the selected elevator car may comprise generating a control signal to the one or more other elevator cars to move away from the driving area of the selected elevator car.

According to an embodiment of the invention, the controlling of the movement of the one or more other elevator cars away from the driving area of the selected elevator car may comprise controlling via the user interface of the operational entity the movement of the one or more other elevator cars away from the driving area of the selected elevator car.

According to an embodiment of the invention, the controlling of the movement of the one or more other elevator cars away from the driving area of the selected elevator car may comprise controlling dynamically the movement of the one or more other elevator cars away from the driving area of the selected elevator car as discussed above. The dynamical controlling may comprise obtaining a distance between the one or more other elevator cars and the selected elevator car during the movement of the selected elevator car. Furthermore, the dynamical controlling may comprise defining based on the obtained distances and moving direction of the selected elevator car whether there is a need to move one or more other elevator cars away from the driving area, and in response to a definition that there is need to move one or more other elevator cars away from the driving area, generating a control signal to said one or more elevator cars to move away from the driving area of the selected elevator car. The distance between the one or more other elevators and the selected moving elevator car may be obtained by from the elevator car or by the elevator control unit.

Figure 5:
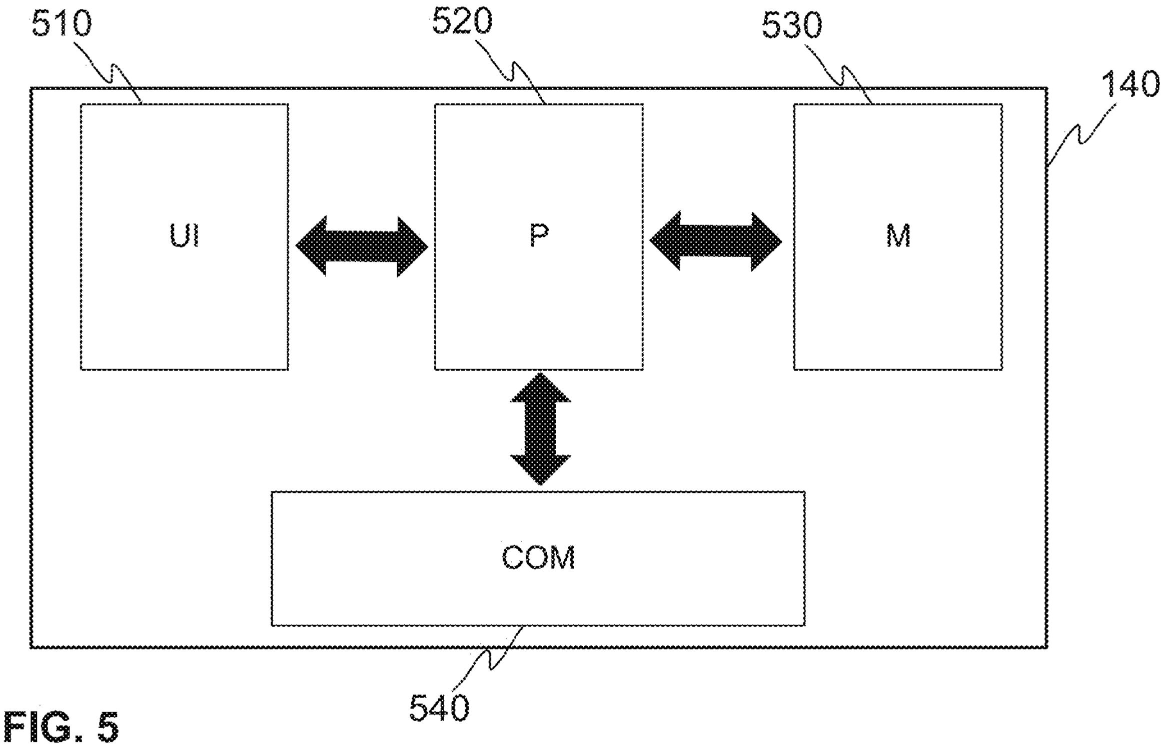
FIG. 5 schematically illustrates an example of the elevator control unit according to the invention.

FIG. 5 schematically illustrates an example of elevator control unit 140 according to the invention. The elevator control unit 140 may comprise a processing unit 510 comprising one or more processors, a memory unit 520 comprising one or more memories, a communication unit 530 comprising one or more communication devices, and a user interface (UI) 540. The mentioned elements of may be communicatively coupled to each other with e.g. an internal bus. The one or more processors of the processing unit 510 may be any suitable processor for processing information and control the operation of the elevator control unit 140, among other tasks. The memory unit 520 may store portions of computer program code and any other data, and the processing unit 510 may cause the elevator control unit 140 to operate as described by executing at least some portions of the computer program code stored in the memory unit 520. Furthermore, the one or more memories of the memory unit 520 may be volatile or non-volatile. Moreover, the one or more memories are not limited to a certain type of memory only, but any memory type suitable for storing the described pieces of information may be applied in the context of the invention. The communication unit 540 may be based on at least one known communication technologies, either wired or wireless, in order to exchange pieces of information as described earlier. The communication unit 540 provides an interface for communication with any entities of the multicar elevator system 100, such as the operational entity 160, or any external units, such as database and/or any external systems. The user interface 530 may comprise input/output (I/O) devices, such as buttons, keyboard, touch screen, microphone, loudspeaker, display and so on, for receiving input and outputting information.

The above described multicar elevator system, method and operational entity provide advantages compared to prior art solution at least in that the rescue and/or inspection drive of the multicar elevator system may be improved. Furthermore, the present invention enables that more than one maintenance technician may work at different elevator shaft levels at the same time without compromising the safety, if the shaft levels are determined as working areas, from which redundant elevator cars are automatically removed.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for controlling movement of two or more elevator cars of a multicar elevator system, wherein the method comprises:

selecting a specific elevator car to be moved from among a plurality of elevator cars to obtain a selected elevator car, the selecting being performed based on an identity of the specific elevator car input manually via a user interface of an operational entity;

controlling movement of one or more other elevator cars away from a driving area of the selected elevator car, the one or more other elevator cars being among the plurality of elevator cars, and the one or more other elevator cars not including the selected elevator car; and controlling movement of the selected elevator car via the user interface contemporaneous with the movement of the selected elevator car in the driving area.

2. The method according to claim 1, wherein the controlling movement of the one or more other elevator cars comprises:

generating a control signal to cause the one or more other elevator cars to move away from the driving area;

controlling the movement of the one or more other elevator cars via the user interface; or dynamically controlling the movement of the one or more other elevator cars.

3. The method according to claim 2, wherein the dynamically controlling comprises:

obtaining a distance between the one or more other elevator cars and the selected elevator car during the movement of the selected elevator car;

determining whether to move the one or more other elevator cars away from the driving area based on the distance and a moving direction of the selected elevator car; and generating a control signal to cause the one or more elevator cars to move away from the driving area in response to determining to move the one or more elevator cars.

4. The method according to claim 3, wherein the obtaining the distance between the one or more other elevator cars and the selected elevator car obtains the distance from:

one among the selected elevator car or the one or more elevator cars; or an elevator control unit.

5. The method according to claim 1, wherein the driving area of the selected elevator car is:

predefined; or selected manually via the user interface.

6. The method according to claim 1, further comprising displaying respective locations of the plurality of elevator cars on the user interface such that the user interface displays a location of each of the plurality of elevator cars.

7. The method according to claim 1, wherein the user interface includes a plurality of indications respectively identifying the plurality of elevator cars; and the selecting comprises selecting a corresponding indication of the specific elevator car to be moved from among the plurality of indications.

8. The method according to claim 1, wherein each of the plurality of elevator cars is configured to move along a first axis and a second axis, the first axis being perpendicular to the second axis.

9. The method according to claim 1, wherein the multicar elevator system includes a first shaft and a reservation shaft, the first shaft being configured to guide the plurality of elevator cars between landings of the multicar elevator system, the reservation shaft being configured to store a first elevator car such that a second elevator car traveling in the first shaft passes the first elevator car, and the first elevator car and the second elevator car being among the plurality of elevator cars.

10. The method according to claim 9, wherein the first shaft is perpendicular to the reservation shaft.

11. The method according to claim 1, wherein the multicar elevator system includes a first shaft, a second shaft, a third shaft and a fourth shaft, the second shaft being parallel to the first shaft, the third shaft being parallel to the fourth shaft, the first shaft being perpendicular to the third shaft, and the multicar elevator system being configured to guide the plurality of elevator cars in a loop via the first shaft, the second shaft, the third shaft and the fourth shaft.

12. The method according to claim 1, further comprising:

stopping, via the user interface, the movement of the one or more other elevator cars, or the movement of the selected elevator car.

13. A multicar elevator system comprising:

a plurality of elevator cars;

an operational entity including a user interface, the user interface being configured to generate one or more control signals indicative of selecting a specific elevator car to be moved from among the plurality of elevator cars to obtain a selected elevator car, the one or more control signals indicative of selecting the specific elevator car being generated based on an identity of the specific elevator car being input via the user interface; and an elevator control unit configured to, control movement of one or more other elevator cars away from a driving area of the selected elevator car, the one or more other elevator cars being among the plurality of elevator cars, and the one or more other elevator cars not including the selected elevator car, and control movement of the selected elevator car contemporaneous with the movement of the selected elevator car in the driving area.

14. The multicar elevator system according to claim 13, wherein the elevator control unit is configured to control the movement of the selected elevator car in response to receiving one or more control signals indicative of the movement of the selected elevator car from the user interface.

15. The multicar elevator system according to claim 13, wherein the elevator control unit is configured to control the movement of the one or more other elevator cars including:

generating a control signal to cause the one or more other elevator cars to move away from the driving area;

controlling the movement of the one or more other elevator cars in response to receiving one or more control signals indicative of the movement from the user interface; or dynamically controlling the movement of the one or more other elevator cars.

16. The multicar elevator system according to claim 15, wherein the elevator control unit is configured to dynamically control the movement of the one or more other elevator cars including:

obtaining a distance between the one or more other elevator cars and the selected elevator car during the movement of the selected elevator car;

determining to move one or more other elevator cars away from the driving area based on the distance and a moving direction of the selected elevator car; and generating a control signal to cause the one or more other elevator cars to move away from the driving area in response to determining to move the one or more other elevator cars.

17. The multicar elevator system according to claim 16, wherein the obtaining the distance between the one or more other elevator cars and the selected elevator car comprises:

obtaining the distance from one among the selected elevator car or the one or more other elevator cars; or measuring the distance.

18. The multicar elevator system according to claim 13, wherein the operational entity is one of the following:

a test and emergency panel arranged outside an elevator shaft;

an inspection drive station arranged inside the elevator shaft; or a mobile device.

19. An operational entity for controlling movement of two or more elevator cars of a multicar elevator system, the operational entity comprising a user interface configured to:

generate one or more control signals indicative of selecting a specific elevator car to be moved from among a plurality of elevator cars to obtain a selected elevator car, the one or more control signals indicative of selecting the specific elevator car being generated based on an identity of the specific elevator car being input via the user interface;

generate one or more control signals to control movement of one or more other elevator cars away from a driving area of the selected elevator car, the one or more other elevator cars being among the plurality of elevator cars, and the one or more other elevator cars not including the selected elevator car; and generate one or more control signals to control movement of the selected elevator car contemporaneous with the movement of the selected elevator car in the driving area.

20. The operational entity according to claim 19, wherein the operational entity is one of the following:

a test and emergency panel arranged outside an elevator shaft;

an inspection drive station arranged inside the elevator shaft; or a mobile device.

* * * * *